United States Patent [19]

Green

[11] Patent Number: 4,694,733
[45] Date of Patent: Sep. 22, 1987

[54] CABLE SHIELD FOR A RODLESS CYLINDER

[75] Inventor: Joseph H. Green, Dearborn, Mich.

[73] Assignee: Greenco Corporation, Dearborn, Mich.

[21] Appl. No.: 796,416

[22] Filed: Nov. 8, 1985

[51] Int. Cl.$^4$ ............................ F01B 29/00; F01B 9/00
[52] U.S. Cl. ............................................ 92/88; 92/137; 74/615
[58] Field of Search ............... 92/137, 88; 254/1; 74/612, 613, 615, 608; 474/144, 146

[56] References Cited

U.S. PATENT DOCUMENTS

| | | | |
|---|---|---|---|
| 289,381 | 12/1883 | Bodifield et al. | 138/110 |
| 795,651 | 7/1905 | Roy | 474/146 |
| 2,530,811 | 10/1950 | Carmer, Jr. et al. | 174/135 |
| 2,903,840 | 9/1959 | Teupel et al. | 74/608 X |
| 3,321,924 | 5/1967 | Liddell | 61/54 |
| 3,810,490 | 5/1974 | Ludwick | 138/106 |
| 4,396,797 | 8/1983 | Sakuragi et al. | 174/68 C |
| 4,415,764 | 11/1983 | Priaroggia et al. | 174/37 |
| 4,472,981 | 9/1984 | Peter | 92/137 X |

FOREIGN PATENT DOCUMENTS 835710  6/1981  U.S.S.R. .................... 74/615

*Primary Examiner*—Robert E. Garrett
*Assistant Examiner*—Mark A. Williamson
*Attorney, Agent, or Firm*—Gifford, Groh, VanOphem, Sheridan, Sprinkle and Dolgorukov

[57] ABSTRACT

A rodless cylinder having an elongated cylinder and a fluid actuated piston longitudinally reciprocally mounted in the cylinder and an actuator mechanically connected to the piston. A first cable or a slot seal extends from one end of the actuator and to one end of the cylinder while a second cable or seal extends from the other end of the actuator and to the other end of the cylinder. An elongated flexible strip has one end attached to the actuator and its other end mounted to a take up reel so that the strip overlies and protects the cable or seal against sparks, caustic chemicals, and the like.

18 Claims, 5 Drawing Figures

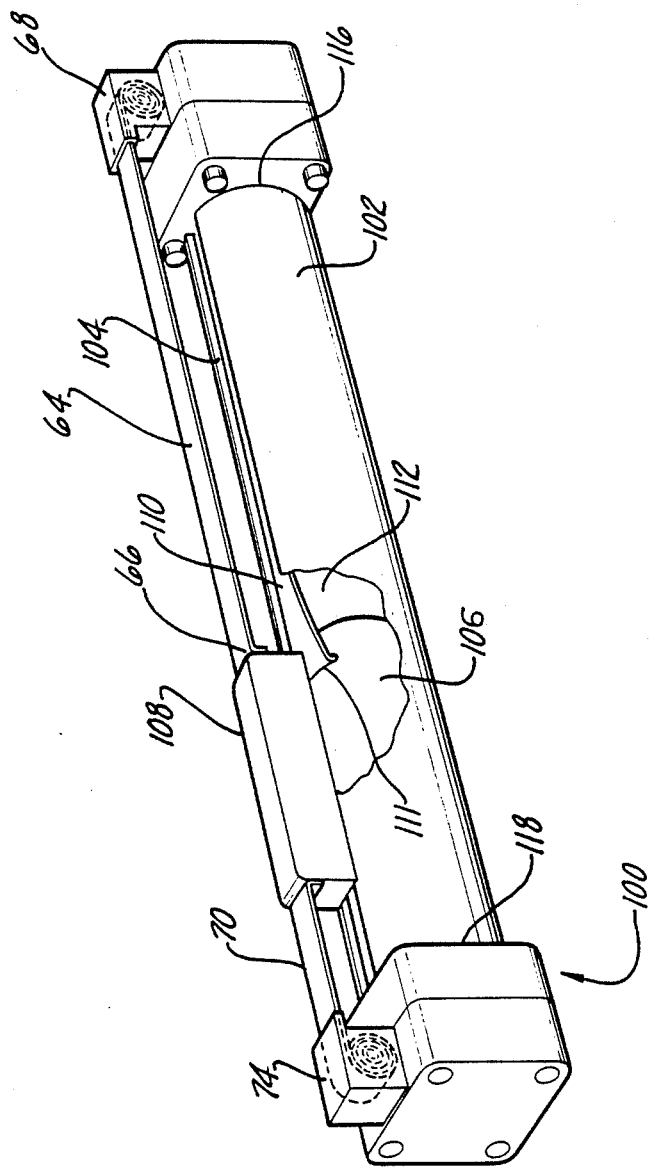

CABLE SHIELD FOR A RODLESS CYLINDER

BACKGROUND OF THE INVENTION

I. Field of the Invention

The present invention relates generally to rodless cylinders and, more particularly, to a rodless cylinder with a shield for the cable of the rodless cylinder.

II. Description of the Prior Art

There are a number of previously known rodless cylinders which are typically employed in manufacturing operations for moving a tool, workpiece or the like between different positions. Such rodless cylinders not only have a shorter overall length than a conventional piston and cylinder actuator for a given stroke, but are also more easily adaptable to different types of operations.

These previously known rodless cylinders typically comprise an elongated cylinder having a fluid actuated piston longitudinally reciprocally mounted therein. A wheel or pulley is also rotatably mounted to each end of the cylinder.

One elongated cable then extends between one end of the piston, around one pulley and has its other end attached to an actuator. Similarly, a second elongated cable is attached to the other end of the piston, extends around the other pulley and is attached to the other end of the actuator. Consequently, the actuator moves in synchronism with, but in the opposite direction from, the piston. In addition, appropriate seals fluidly seal the cable to the cylinder.

In another type of rodless cylinder, a portion of the piston extends outwardly through a slot in the cylinder to form the actuator. A flexible seal closes the slot between the piston and each end of the cylinder.

Such rodless cylinders are frequently employed in welding manufacturing operations and manufacturing operations involving caustic chemicals. Sparks from welding operations, as well as caustic chemicals from other manufacturing operations, frequently impinge upon the cables of the rodless cylinder thus damaging the cables and/or seal and ultimately rendering the rodless cylinder inoperable.

SUMMARY OF THE PRESENT INVENTION

The present invention provides a rodless cylinder which overcomes the above mentioned disadvantages of the previously known devices.

In brief, the rodless cylinder of the present invention, like the previously known rodless cylinders, includes an elongated cylinder having a fluid actuated piston longitudinally reciprocally mounted within the interior of the cylinder. A wheel or pulley is rotatably secured to each end of the cylinder.

A first cable extends from one end of the piston, around one pulley and is attached to one end of an actuator. Likewise, a second cable extends from the other end of the piston, around the other pulley and is attached to the other end of the actuator. Thus, like the previously known rodless cylinders, the actuator moves in synchronism with the piston but in the opposite direction from the piston.

Unlike the previously known rodless cylinders, however, one end of an elongated flexible strip is attached to one end of the actuator while the other end of the flexible strip is wound around a spring loaded take up reel. Similarly, a second elongated flexible strip has one end attached to the other end of the actuator while the other end of the second strip is wound around a second spring loaded take up reel. The take up reels are positioned relative to the cylinder so that one strip overlies one cable while the other strip overlies the other cable. Furthermore, the strips have a greater width than the diameter of the cables so that the strips protect the cables against sparks, caustic chemicals, and the like.

In the second type of rodless cylinder, i.e. in which a portion of the piston extends outwardly through a slot in the cylinder to form the actuator, the flexible strip overlies the cylinder seal and protects the seal from sparks, caustic chemicals and the like.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 5 is a partial sectional view illustrating a second preferred embodiment of the invention.

DETAILED DESCRIPTION OF A PREFERRED EMBODIMENT OF THE PRESENT INVENTION

Figure 1:
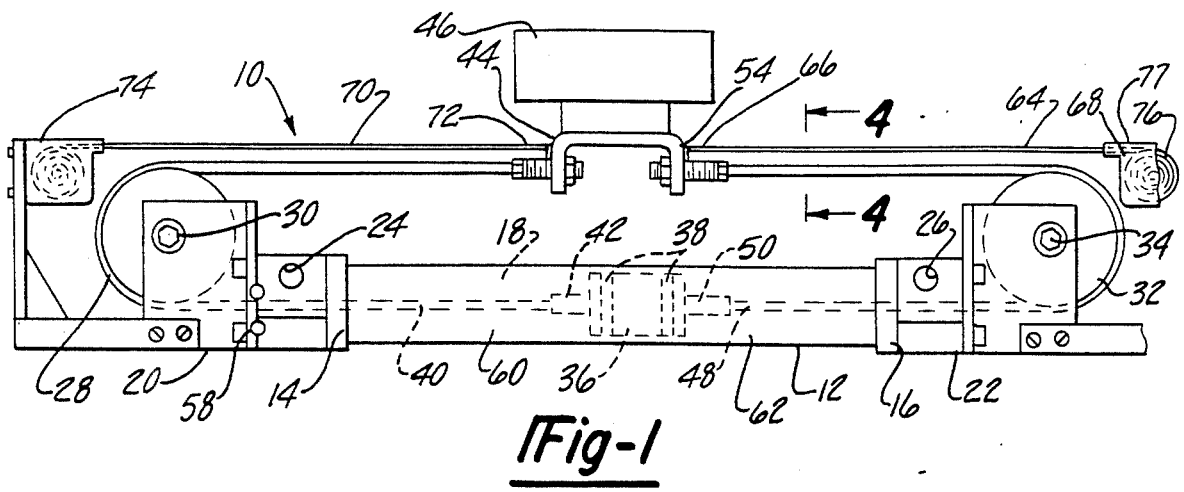
FIG. 1 is a partial sectional side view illustrating a preferred embodiment of the present invention.

With reference first to FIG. 1, a rodless cylinder 10 is thereshown and comprises an elongated tubular cylinder 12 having a first end 14 and a second end 16. The cylinder 12 is typically cylindrical in cross sectional shape and thus defines an elongated cylindrical chamber 18.

An end housing 20 is attached to the end 14 of the cylinder 12 and a substantially identical end housing 22 is attached to the opposite end of the cylinder 12 in any conventional fashion. Each end housing 20 or 22 includes fluid fittings 24 and 26, respectively for pressurizing or depressurizing the cylinder chamber 18 for a reason which will subsequently become apparent.

A pulley 28 is rotatably mounted to the end housing 20 by an axle 30 and a similar pulley 32 is rotatably mounted to the other end housing 22 by an axle 34. The axles 30 and 34 are spaced apart and parallel to each other and are generally perpendicular with respect to the axis of the cylinder 12.

A piston 36 is longitudinally reciprocally mounted within the cylindrical chamber 18 and divides the chamber 18 into two subchambers 60 and 62. Conventional fluid seals 38 fluidly seal the piston 36 to the interior wall of the cylinder 12.

A first cable 40 has one end secured to one end 42 of the piston 36 in any conventional fashion. The cable 40 extends longitudinally through the cylinder 12 from the end 42 of the piston 36, through the cylinder end 14, around the pulley 28 and has its other end attached to one end 44 of an actuator 46 which is positioned exteriorly of the cylinder 12. Similarly, a second cable 48 is attached to the other end 50 of the piston 36 so that the cable 48 extends from the piston end 50, through the cylinder end 16, around the pulley 32 and has its other end attached to the other end 54 of the actuator 46.

Conventional fluid seals 58 within each end housing 20 and 22 fluidly seal the cables 40 and 48 to the end housings 20 and 22 thereby fluidly sealing the cylinder chamber 18.

In operation, fluid pressurization of the subchamber 60 forces the piston 36 rightwardly, as viewed in FIG. 1, thus moving the actuator 46 leftwardly in synchronism with the piston 36 and vice versa. Furthermore, although the cables 40 and 48 have been described as separate cables, it will be understood that the cables 40 and 48 may be integral with each other.

Figure 2:
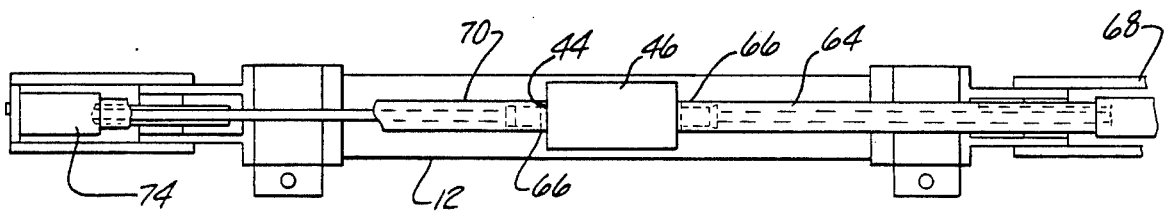
FIG. 2 is a top view of the embodiment shown in FIG. 1.
Figure 4:
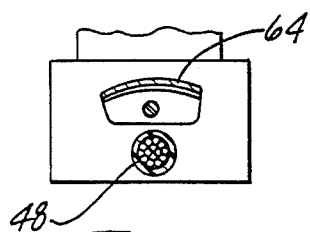
FIG. 4 is a cross sectional view taken substantially along line 4—4 in FIG. 1 and enlarged for clarity.

The rodless cylinder 10 thus far described is conventional in construction. With reference then to FIGS. 1, 2 and 4, the novelty of the present invention resides in its provision of an elongated flexible strip 64 which has one end 66 attached to one end 54 of the actuator 46. The opposite end of the strip 64 is longitudinally slidably received within a spring loaded take up reel 68 attached to the end housing 22. A second elongated flexible strip 70 has one end 72 attached to the other end 44 of the actuator 46 while the other end of the second strip 70 is also longitudinally slidably received within a spring loaded take up reel 74 secured to the other end housing 20. Since the strips 64 and 70 and their respective take up reels 68 and 74 are substantially identical to each other, only the strip 64 and its reel 68 will be described in detail, it being understood that a like description shall also apply to the strip 70 and its take up reel 74.

As best shown in FIGS. 2 and 4, the strip 64 is thin walled and has a width which is at least as large, and preferably several times larger than, the cable 48. Furthermore, the attachment between the strip 64 and the actuator 46 as well as the position of the take up reel 68 is such that the axis of the strip 64 is parallel to and overlies the exposed portion of the cable 48. As best shown in FIG. 4, the cable 48 is preferably centered with respect to the strip 64 and the strip 64 and cable 48 are closely adjacent each other so that the strip 64 protects the cable 48 from sparks, corrosive or caustic chemicals and the like.

The take up reel 68 is conventional in construction and comprises a spring 76 within a housing 77 which winds the strip 64 into a coil within the housing 77. The spring 76 is sufficiently strong to keep the strip 64 taunt regardless of the longitudinal position of the actuator 46. In addition, as best shown in FIG. 4, the strip 64 is arcuate in cross sectional shape which further rigidifies the strip 64 against twisting and thereby retains the strip 64 above and over the cable 48.

Although the strip 64 can be constructed of any conventional material, it is preferably constructed of spring steel.

Figure 3:
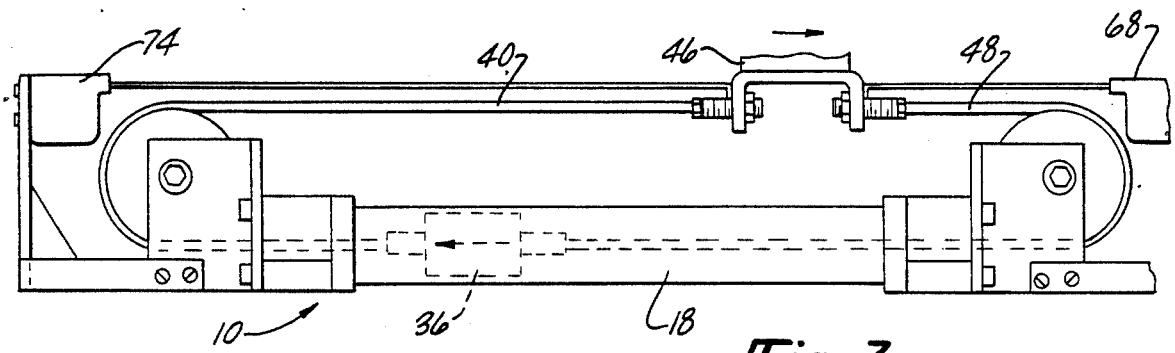
FIG. 3 is a view similar to FIG. 1 but illustrating the actuator in a different longitudinal position than FIG. 1.

With reference then to FIGS. 1 and 3, as the cylinder chamber 18 is pressurized to move the actuator from the position shown in FIG. 1 and to the position shown in FIG. 2, a portion of the first strip 64 is retracted within the take up reel 68 while, conversely, the second strip 70 unwinds from its take up reel 74 due to the movement of the actuator 46. Consequently, the strips 64 and 70 overlie and thus protect the cables 48 and 40 from sparks and corrosive chemicals despite the movement or position of the actuator 46.

With reference now to FIG. 5 a different type of rodless cylinder 100 is thereshown having an elongated cylinder 102 having an elongated slot 104 extending longitudinally along one side of the housing 102. A piston 106 is longitudinally slidably mounted within the cylinder 102 and includes a portion extending outwardly through the slot 104 which forms the actuator 108. In the well known fashion, an elongated flat seal 110 extends between the ends of the cylinder 102, through a slot in the piston 106, and fluidly seals the slot 104 to enable pressurization of the cylinder chambers 112 (only one shown).

Still referring to FIG. 5, the elongated flexible strip 64 has one end 66 attached to the actuator 108 while its other end is longitudinally slidably received within the spring loaded take up reel 68 attached to one end 116 of the cylinder 102. Similarly, the second elongated flexible strip 70 has one end attached to the other end of the actuator 108 while its other end is longitudinally slidably within the spring loaded take up reel 74 mounted at the other end 118 of the cylinder 102.

The strips 64 and 70 are positioned so that they overlie and protect the seal 110 from sparks, corrosive or caustic chemicals and the like.

From the foregoing, it can be seen that the present invention provides a simple, inexpensive, and yet totally effective device for protecting a movable member, i.e. a cable or seal, extending between one end of the actuator and the end of the cylinder housing of a rodless cylinder against sparks, corrosive chemicals and the like. In the event that the strip 64 and/or 70 becomes damaged, the strip 64 and/or 70 can be easily, rapidly and inexpensively replaced without disassembly of the rodless cylinder.

Having described my invention, however, many modifications thereto will become apparent to those skilled in the art to which it pertains without deviation from the spirit of the invention as defined by the scope of the appended claims.

I claim:

1. For use with a rodless cylinder of the type having an elongated cylinder, a fluid actuated piston longitudinally reciprocally mounted in said cylinder, an actuator, a movable member extending between one end of the actuator and one end of the piston, the improvement comprising:
   an elongated flexible strip having a width greater than the width of said movable member,
   means for attaching one end of said elongated strip to one end of said actuator, and
   means longitudinally spaced from one end of said actuator for longitudinally slidably receiving the other end of said strip, said longitudinal receiving means comprising means for winding said strip into a coil and being positioned so that said strip overlies said movable member.

2. The invention as defined in claim 1 wherein said winding means comprises a spring biased reel.

3. The invention as defined in claim 1 wherein said strip is constructed of metal.

4. The invention as defined in claim 3 wherein said strip is constructed of spring steel.

5. The invention as defined in claim 3 wherein said strip has an arcuate cross sectional shape.

6. The invention as defined in claim 1 and comprising:
   a second elongated flexible strip having a width greater thanthe width of a second movable member extending between the other end of the actuator and the other end of the piston,
   means for attaching one end of said second strip to the other end of said actuator, and
   second means longitudinally spaced from the other end of said actuator for longitudinally slidably receiving the other end of said second strip, said second longitudinal receiving means comprising second means for winding said second strip into a coil and being positioned so that said second strip overlies said second movable member.

7. The invention as defined in claim 6 wherein each of said winding means comprises a spring biased reel.

8. The invention as defined in claim 6 wherein each strip is constructed of metal.

9. The invention as defined in claim 8 wherein each strip is constructed of spring steel.

10. The invention as defined in claim 8 wherein each strip has an arcuate cross sectional shape.

11. For use with a rodless cylinder of the type having an elongated cylinder with an elongated longitudinal slot therein, a fluid actuated piston longitudinally, reciprocally mounted in said cylinder, an actuator attached to said piston and extending through said slot, and an elongated flat seal extending between one end of the actuator and one end of the cylinder across said slot to fluidly seal said cylinder, the improvement comprising:
    an elongated flexible strip having a width greater than the width of said slot;
    means for attaching one end of said elongated strip to one end of said actuator; and
    means longitudinally spaced from one end of said actuator for longitudinally slidably receiving the other end of said strip, said longitudinal receiving means comprising means for winding said strip into a coil and being positioned so that said strip overlies one end of said slot.

12. The invention as defined in claim 11 wherein said winding means comprises a spring biased reel.

13. The invention as defined in claim 11 wherein said strip is constructed of spring steel.

14. The invention as defined in claim 13 wherein said strip has an arcuate cross sectional shape.

15. The invention as defined in claim 11 and comprising:
    a second elongated flexible strip having a width greater than the width of said slot;
    means for attaching one end of said second strip to the other end of said actuator; and
    second means longitudinally spaced from the other end of said actuator for longitudinally slidably receiving the other end of said second strip, said second longitudinal receiving means comprising second means for winding said second strip into a coil and being positioned so that said second strip overlies the other end of said slot.

16. The invention as defined in claim 15 wherein each of said winding means comprises a spring biased reel.

17. The invention as defined in claim 15 wherein each strip is constructed of spring steel.

18. The invention as defined in claim 15 wherein each strip has an arcuate cross sectional shape.

* * * * *

UNITED STATES PATENT AND TRADEMARK OFFICE
CERTIFICATE OF CORRECTION

PATENT NO. : 4,694,733

DATED : 9/22/87

INVENTOR(S) : Joseph H. Green

It is certified that error appears in the above-identified patent and that said Letters Patent is hereby corrected as shown below:

Col. 4, line 62, delete "thanthe" and insert --than the--.

Signed and Sealed this

Second Day of February, 1988

Attest:

DONALD J. QUIGG

Attesting Officer

Commissioner of Patents and Trademarks